`United States Patent` [19]

Masaaki

[11] Patent Number: 5,216,363
[45] Date of Patent: Jun. 1, 1993

[54] MAGNETIC POSITION DETECTOR WITH MULTIPLE MAGNETOEFFECT RESISTANCE ELEMENTS

[75] Inventor: Kusumi Masaaki, Kanagawa, Japan
[73] Assignee: Sony Corporation, Tokyo, Japan
[21] Appl. No.: 845,951
[22] Filed: Mar. 4, 1992
[30] Foreign Application Priority Data Mar. 13, 1991 [JP] Japan .................................. 3-49720

[51] Int. Cl.$^5$ ............................ G01B 7/14; G01P 3/42
[52] U.S. Cl. ............................ 324/207.21; 324/207.24; 324/235; 338/32 R
[58] Field of Search ................ 324/207.2, 207.21, 235, 324/251, 252, 207.24, 207.25; 338/32 R, 32 H

[56] References Cited
U.S. PATENT DOCUMENTS 4,818,939 4/1989 Takahashi et al. ............. 324/207.21

Primary Examiner—Walter E. Snow
Attorney, Agent, or Firm—Lewis H. Eslinger; Jay H. Maioli

[57] ABSTRACT

A magnetic sensor disposed in an opposing relation to a magnetic scale magnetized at a grating pitch $\lambda$ in the length direction thereof and which is movable relative to the magnetic scale in the length direction is comprised of at least two magnetoeffect resistance elements disposed with a distance of $(\lambda/2)\cdot n$ ($n=1, 2, 3, \ldots$) in the length direction, the two magnetoeffect resistance elements being formed in the width direction perpendicular to the length direction and each of the magnetoeffect resistance elements having partial magnetoeffect resistance elements distant from each other by a distance of $(\lambda/2)\cdot(\frac{1}{2}m)$ ($m=2, 3, 4, \ldots$) from a predetermined position on the width direction perpendicular to the length direction, wherein the two magnetoeffect resistance elements are shaped as substantially symmetrical configurations relative to a central line in the length direction.

2 Claims, 9 Drawing Sheets

MAGNETIC POSITION DETECTOR WITH MULTIPLE MAGNETOEFFECT RESISTANCE ELEMENTS

BACKGROUND OF THE INVENTION

1. Field of the Invention

The present invention generally relates to magnetic sensors and, more particularly, to a magnetic sensor for use with a position detector in which an electric resistance value changed by a relative movement of magnetoeffect resistance elements disposed in an opposing relation to a magnetic scale is detected and a relative position or the like is detected from the amount of the electric resistance value thus changed.

2. Description of the Prior Art

As is well-known, an electrical signal obtained on the basis of a relative movement of a magnetoeffect resistance element (hereinafter simply referred to as an MR element) disposed in an opposing relation to a magnetic scale magnetized at a constant grating pitch contains a harmonic component other than a fundamental wave component. It is desired that this harmonic component is eliminated because it deteriorates an accuracy in the interpolation processing.

A magnetic sensor 1 constructed as, for example, shown in FIG. 1 is proposed as a technique for reducing the harmonic component according to the prior art.

As shown in FIG. 1, in the magnetic sensor 1, MR elements 5, 6 opposed to a magnetic scale 2 with a grating pitch $\lambda$ and which are distant from MR elements 3, 4, each of which is distant by $\lambda/4$, by a distance $\lambda/12$ are formed on a substrate (not shown) so as to eliminate a third-order harmonic component and the magnetic sensor 1 is connected between a power supply source V0 and the ground. An output V1 is generated from a junction between the MR elements 5 and 4. The output V1 is applied to an amplifier 10 formed of resistors 8, 9 and an operational amplifier 11 as shown in FIG. 2 and a sine wave signal is obtained from an output V2 of the amplifier 10 when the magnetic sensor 1 is moved relatively in the length direction of the magnetic scale 2. A reference voltage VR is supplied to a non-inverting input terminal of the operational amplifier 11.

In the industrial field in which the length is measured by using the magnetic scale 2, e.g., in the machine tool field, it is required that the magnetic sensor becomes higher in accuracy. In order to make the magnetic sensor become higher in accuracy, the grating pitch of the magnetic scale 2 must be reduced. However, in the magnetic sensor 1 constructed as shown in FIG. 1, a pattern width W1 of the MR elements 3 through 6 is about 10 $\mu$m at best because of various limits such as sensitivity, manufacturing technique of MR elements or the like. Further, a clearance D1 between pattern edges of adjacent MR elements (e.g., the MR elements 3 and 5) is about 5 $\mu$m at best. Accordingly, as to the length of $\lambda/12$, the minimum value $(\lambda/12)$ min thereof is represented as $(\lambda/12)$ min = W1 + D1 = 15 $\mu$m. As a consequence, the minimum value $\mu$min of the grating pitch $\lambda$ cannot be reduced to less than $\mu$min = 12 $\times$ (W1 + D1) = 180 $\mu$m.

The assignee of the present application has previously proposed a technique which can solve the aforesaid problem (see Japanese Patent Application No. 2-150688). This previously-proposed magnetic sensor technique will be described with reference to FIG. 3.

As shown in FIG. 3, an MR element 12 or 13 having a crank-shaped portion is formed as a magnetic sensor element. The pattern width of the crank-shaped portion is either increased as compared with that of its straight portion or is formed of a conductive material. In the example of FIG. 3, since a clearance D2 corresponding to the clearance D1 shown in FIG. 1 may be reduced to zero (D2=0), there is then the excellent advantage such that the grating pitch $\lambda$ can be reduced.

In the magnetic sensor shown in the example of FIG. 3, when the length direction of the magnetic scale 2 and the length direction of the pattern of the magnetic sensor element are displaced by an azimuth angle $\theta 1$, then a position at which the harmonic wave involved in the output V1 is minimized and a position at which the output V1 itself is maximized ar displaced from each other as shown in FIGS. 4A and 4B. The reason for this is that, when the magnetic sensor is disposed with an inclination angle as shown in FIGS. 4A and 4B, then the lateral magnetic field H acts on the entirety of the MR elements 12, 13, resulting in the resistance thereof being changed considerably.

In actual practice, MR elements 15 to 18 constitute a magnetic sensor 14 as shown in FIG. 5, the MR elements 15 to 18 of this magnetic sensor 14 constitute a bridge circuit and a differential amplifier 24 formed of resistors 19 to 22 and an operational amplifier 23 is connected to the bridge circuit as shown in FIG. 6. FIG. 7 shows an output characteristic of the circuit of FIG. 6. As is clear from FIG. 7, a position ($\theta = -10'$) at which an output V5 [V] of the circuit of FIG. 6 is maximized and a position ($\theta = -30'$) at which a harmonic distortion N/S [dB] such as three-order harmonic distortion D3A, five-order harmonic distortion D5A or the like is minimized are displaced from each other relative to the change of the azimuth angle $\theta$ (minute).

When the disposed position of the magnetic sensor 14 or the like relative to the magnetic scale 12 is determined, then the disposed position is determined by adjusting a clearance between a head holder (not shown) in which the magnetic sensor 14 is housed and the magnetic scale 2, the azimuth angle or the like. When the clearance, the azimuth angle or the like are adjusted in order to determined the disposed position, it is easy and reliable to perform the adjustment in such a fashion that the amplitude of the output V5 may be maximized while a magnitude of the output V5 is observed by means of an oscilloscope or the like.

However, when the clearance, the azimuth angle or the like are adjusted as described above, the position (azimuth angle $\theta$) at which the maximum value of the output V5 is obtained and the position (azimuth angle $\theta$) at which the minimum value of the harmonic wave (three-order harmonic distortion D3A, five-order harmonic distortion D5A or the like) are not coincident with each other. As a result, when the output V5 is processed by an interpolation processing in order to make the measuring become higher in accuracy, there is then the new problem such that the measuring at high accuracy is made rather difficult by the influence of the harmonic distortion.

OBJECTS AND SUMMARY OF THE INVENTION

Therefore, it is an object of the present invention to provide an improved magnetic sensor in which the aforesaid shortcomings and disadvantages of the prior art can be eliminated.

It is an object of the present invention to provide a magnetic sensor in which, when a magnetic sensor and a magnetic scale are mounted, a position at which an output of the magnetic sensor is maximized and a position at which a harmonic wave is minimized can be determined as substantially the same position (azimuth angle).

It is another object of the present invention to provide a magnetic sensor in which a magnetic sensor can be mounted at a desired position with ease reliably.

As a first aspect of the present invention, a magnetic sensor disposed in an opposing relation to a magnetic scale magnetized at a grating pitch $\lambda$ in its length direction and which is movable relative to the magnetic scale in its length direction is comprised of at least two magnetoeffect resistance elements disposed with a distance of $(\lambda/2) \cdot n$ ($n=1, 2, 3, \ldots$) in the length direction, the two magnetoeffect resistance elements being formed in the width direction perpendicular to the length direction and each of the magnetoeffect resistance elements having partial magnetoeffect resistance elements distant from each other by a distance of $(\lambda/2) \cdot (\frac{1}{2}m)$ ($m=2, 3, 4, \ldots$) from a predetermined position on the width direction perpendicular to the length direction, wherein the two magnetoeffect resistance elements are shaped as substantially symmetrical configurations relative to a central line in the length direction.

In accordance with a second aspect of the present invention, a magnetic sensor disposed in an opposing relation to a magnetic scale magnetized at a grating pitch $\lambda$ in its length direction and which is movable relative to the magnetic scale in its length direction is comprised of at least two magnetoeffect resistance elements disposed in the direction perpendicular to the length direction by a predetermined distance and disposed with a distance of $\lambda/4$ in the length direction, wherein the two magnetoeffect resistance elements are shaped as substantially symmetrical configurations relative to a central line in the length direction and each of the two magnetoeffect resistance elements has partial magnetoeffect resistance elements distant from each other by a distance of $(\lambda/2) \cdot (\frac{1}{2}m)$ ($m=2, 3, 4, \ldots$) from a predetermined position on the width direction perpendicular to the length direction.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Figure 1:
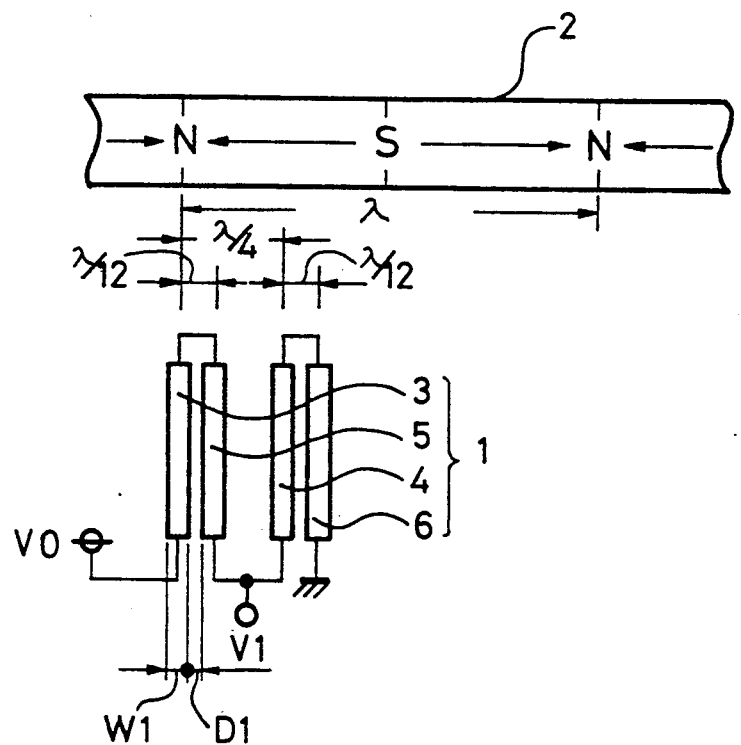
FIG. 1 is a schematic plan view illustrative of a structure of a magnetic sensor according to an example of the prior art.
Figure 2:
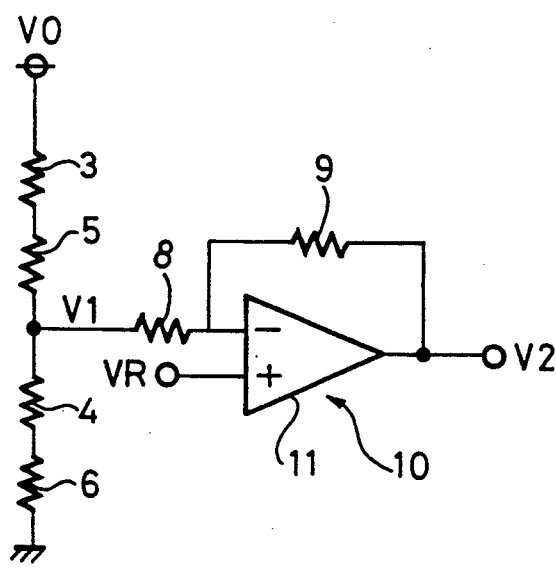
FIG. 2 is a diagram showing an output circuit which employs the magnetic sensor of the prior-art example shown in FIG. 1.
Figure 3:
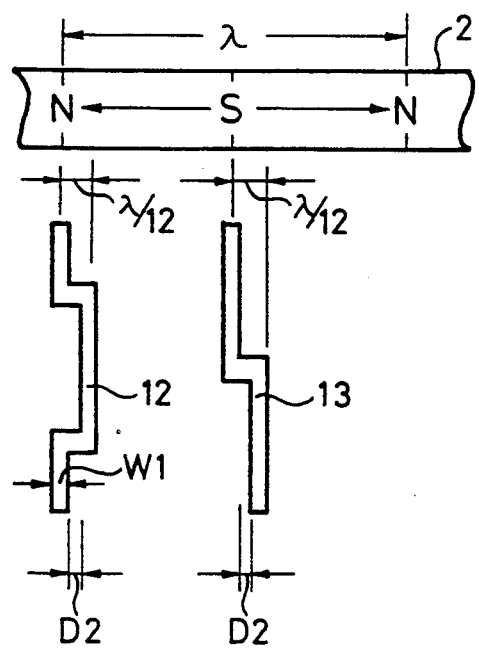
FIG. 3 is a schematic diagram illustrative of a structure of a magnetic sensor according to other example of the prior art.
Figure 4A:
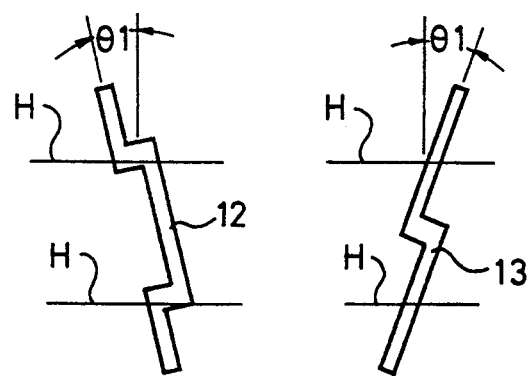
FIGS. 4A and 4B are respectively schematic diagrams used to explain operation of the magnetic sensor according to the example of FIG. 3 relative to the change of azimuth angle.
Figure 4B:
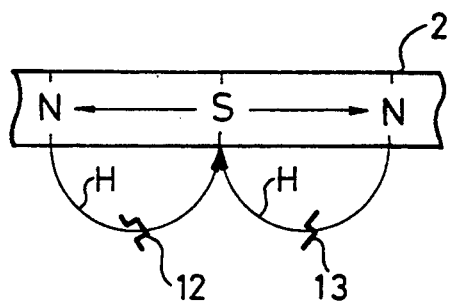
Figure 5:
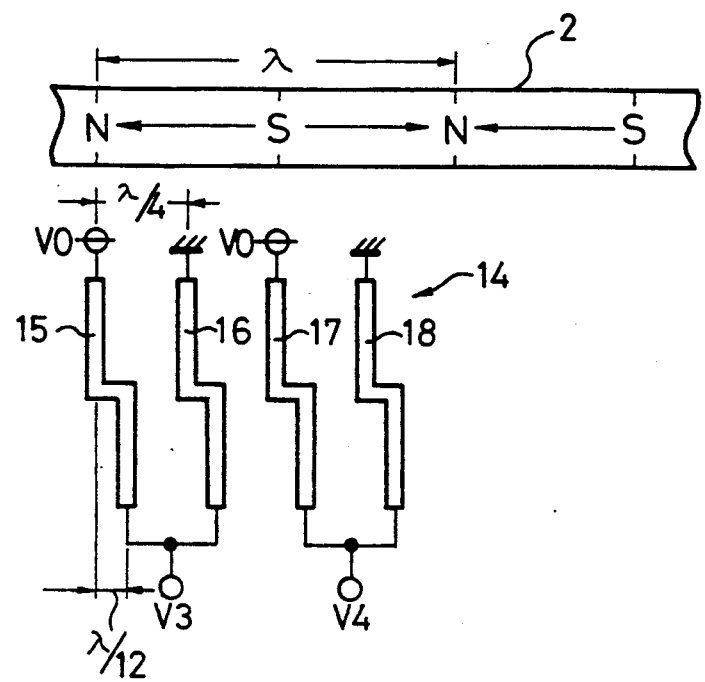
FIG. 5 is a schematic plan view illustrative of a structure of a magnetic sensor according to a further example of the prior art.
Figure 6:
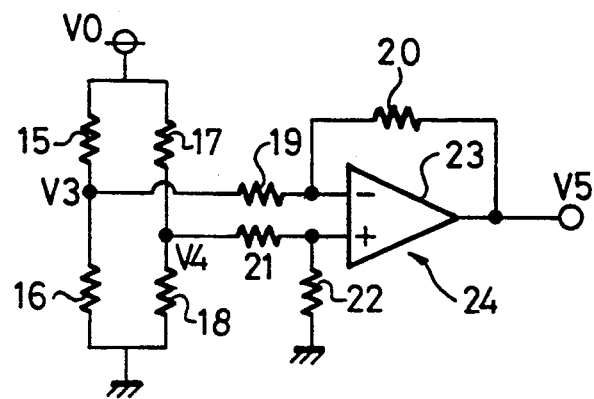
FIG. 6 is a diagram showing an output circuit which employs the magnetic sensor of the prior-art example shown in FIG. 5.
Figure 7:
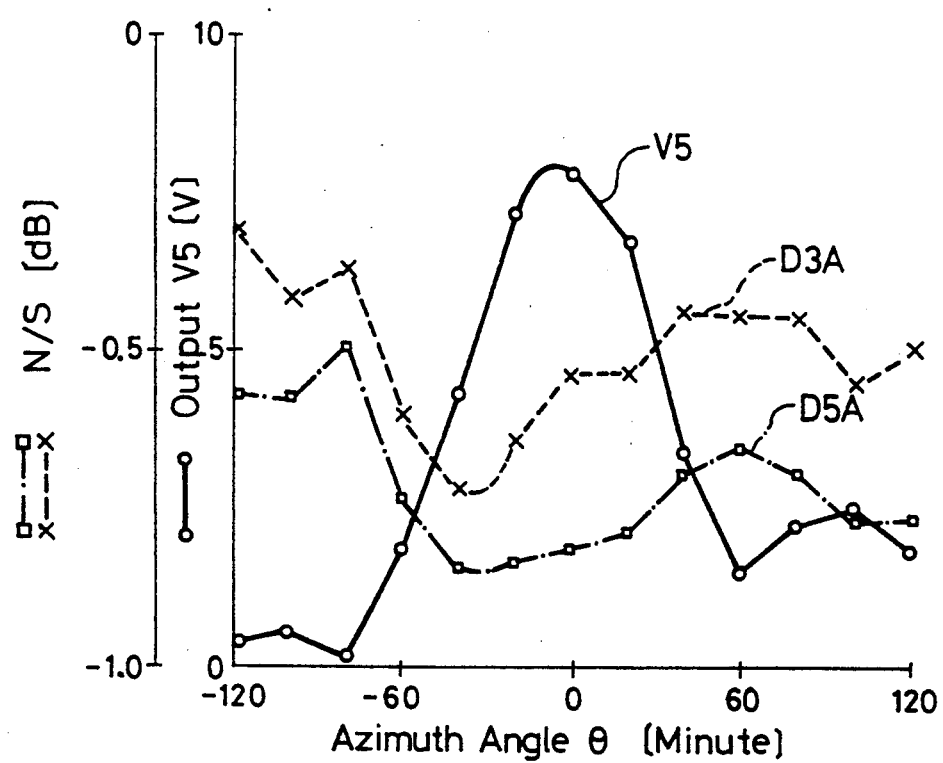
FIG. 7 is a characteristic graph graphing the output characteristic of the magnetic sensor of the prior-art example of FIG. 5 relative to the change of an azimuth angle.

The present invention will now be described with reference to the accompanying drawings in which like reference numerals corresponding to those of FIGS. 1 to 7 are marked with the same reference numerals and therefore need not be described in detail.

Figure 8:
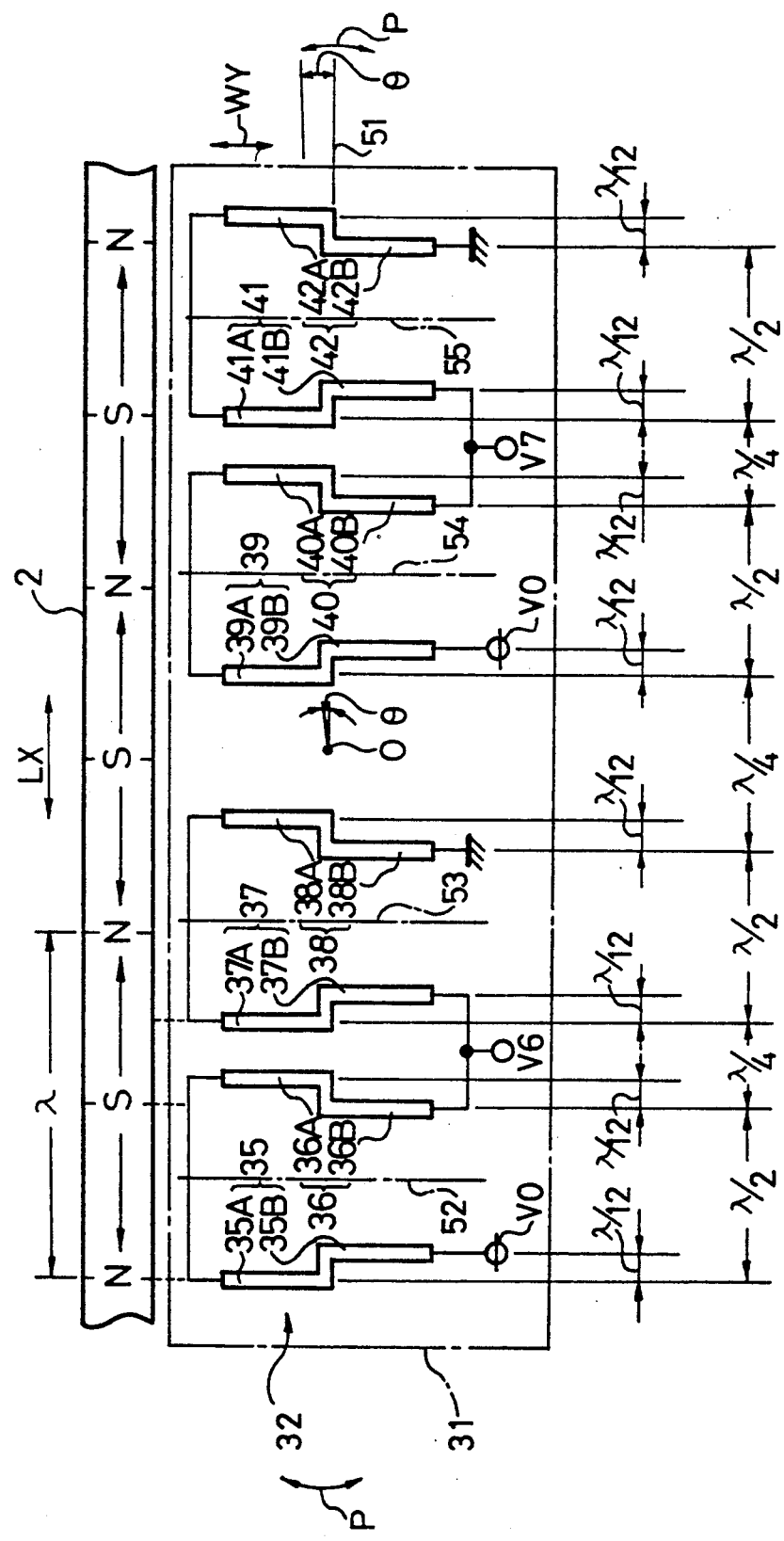
FIG. 8 is a schematic plan view illustrating a structure of a magnetic sensor according to a first embodiment of the present invention.

Referring to FIG. 8 which shows an embodiment of the present invention, the magnetic scale 2 is magnetized at the grating pitch $\lambda$ in its length direction LX, and a magnetic sensor 32 formed on a substrate 31 is opposed to the magnetic scale 2. The magnetic sensor 32 includes MR elements 35 to 42 and the MR elements 35 to 42 respectively include partial MR elements 35A, 35B; 36A, 36B; 37A, 37B; 38A, 38B; 39A, 39B; 40A, 40B; 41A, 41B; and 42A, 42B which are distant from each other by $\lambda/12$ in the length direction LX from a constant position of a width direction WY perpendicular to the length direction LX, that is, from a center position 51 in this embodiment. The an elements 35 and 36 are shaped as substantailly symmetrical configurations with respect to a central line 52 in the length direction LX and similarly, the MR element 37 (39, 41) and the MR element 38 (40, 42) are shaped as substantially symmetrical configurations with respect to a central line 53 (54, 55) in the length direction LX.

The magnetic sensor 32 can be moved relatively in the length direction LX of the magnetic scale 2. Although the magnetic scale 2 and the MR elements 35 to 42 are opposed to one another in actual practice, they are displaced in the vertical direction so as to obtain a better understanding of the present invention.

The MR elements 35 and 36 are made distant from each other by a distance of $(\lambda/2) \cdot n$ ($n=1, 2, 3, \ldots$), e.g., $\lambda/2$ in the length direction LX and in a like manner, the MR elements 37 and 38 are made distant from each other by a length of $\lambda/2$ in the length direction LX. Similarly, the MR elements 39 and 40 are also disposed with a distance of $\lambda/2$, and the partial MR elements 35A to 42A are made distant from the partial MR elements 35B to 42B with a distance of $(\lambda/2)\cdot(\frac{1}{m})=(m=2, 3, 4, \ldots,)$, e.g., $\lambda/12$.

The MR elements 35 through 38 are connected in series and respective terminals thereof are connected to a power supply source V0 and the ground, respectively. Similarly, the MR elements 39 to 42 are connected in series and respective terminals thereof are connected to the power supply source V0 and the ground, respectively.

Figure 10:
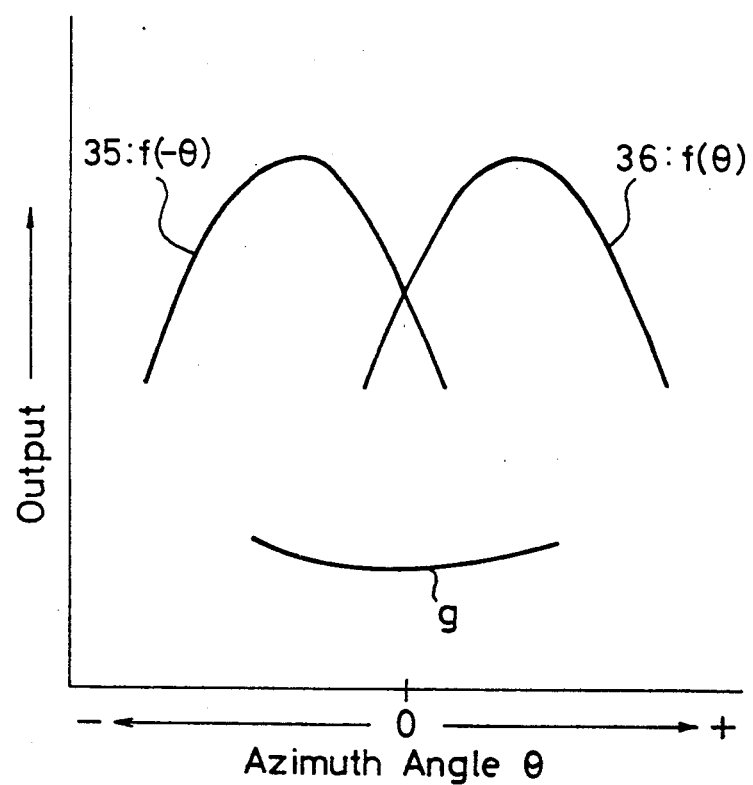
FIG. 10 is a schematic diagram used to explain a principle of operation of the magnetic sensor according to the first embodiment of FIG. 8.

The magnetic sensor 32 thus arranged is connected in a bridge circuit configuration and is connected to a differential amplifier 24 which comprises the resistors 19 through 22 and the operational amplifier 23 as shown in FIG. 10. The differential amplifier 24 derives an output V8. The MR elements 35 and 36 constitute an MR element 55' and the MR element 37 (39, 41) and the MR element 38 (40, 42) similarly constitute MR elements 56 to 58.

Operation of the above-mentioned embodiment will be described below.

Figure 11:
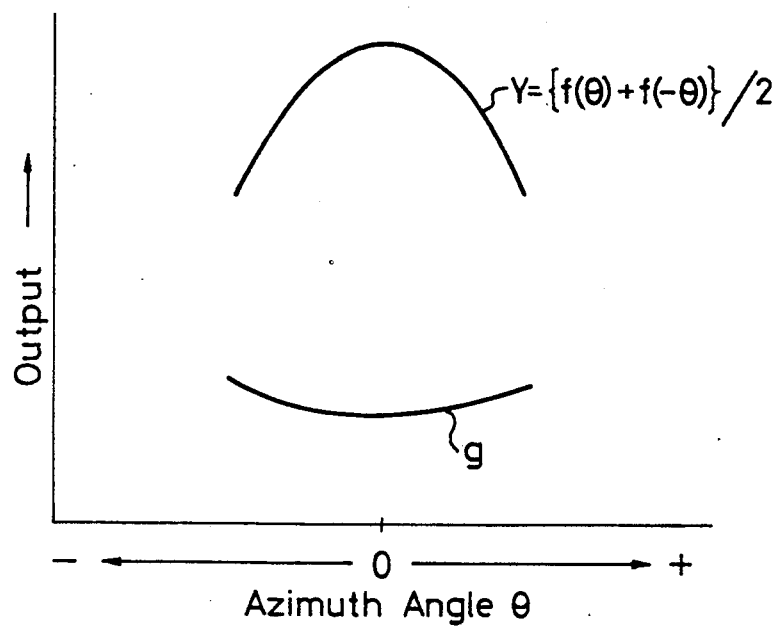
FIG. 11 is a schematic diagram showing a characteristic which results from, synthesizing the characteristics shown in FIG. 10.

In this case, let us consider the MR elements 35 and 36 as typical examples. Since the MR elements 35 and 36 are disposed on the same phase in the length direction LX of the magnetic scale 2, changing characteristics (output characteristics) of voltage across the MR element 35 (MR element 36) due to the change of the resistance values thereof become characteristics (shown by a function $f(\theta)$ and a function $f(-\theta)$ in FIG. 10) symmetrical with respect to the azimuth angle $\theta$ (azimuth rotation of the magnetic sensor 32 in the direction shown by an arrow P in FIG. 8). In the case of the azimuth rotation, a three-order component of the voltage across the MR element 35 (MR element 36) becomes the same characteristic g. If these characteristics are synthesized, we have a synthesized output Y $[Y=\{f(x)+f(-x)\}/2]$ as shown in FIG. 11. The synthesized characteristic of the three-order component is not changed at the characteristic g so that the position at which the output is maximized and the position at which the harmonic wave (three-order harmonic wave, in this case) is minimized become coincident with each other.

Let us now show the above-mentioned synthesizing process from a mathematics standpoint.

The differentiation of the synthesized output by the azimuth angle $\theta$ yields $Y'=\{f'(\theta)-f'(-\theta)\}/2$. When the azimuth angle $\theta$, which is a variable, is 0 ($\theta=0$), we have $Y'=\{f'(0)-f'(0)\}/2=0$. Thus, $\theta=0$ yields an extreme value. When a secondary differentiation $Y''$ of the synthesized output Y is calculated in order to check the extreme value, we have $Y''=\{f''(\theta)+f''(-\theta)\}/2$. Since the function $f(\theta)$ and the function $f(-\theta)$ are both functions which are upwardly convexed in a target range, $f''(\theta)<0$ and $f''(-\theta)<0$ are established. As a consequence, $Y''<0$ is established. Therefore, the synthesized output becomes a function convexed in the upper direction and takes the extreme value when $\theta=0$.

Figure 9:
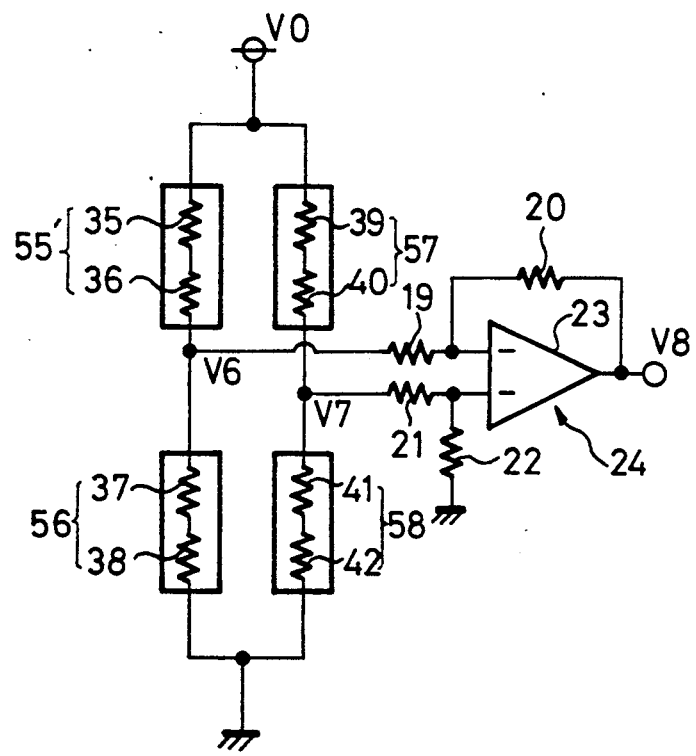
FIG. 9 is a diagram of an output circuit which employs the magnetic sensor of the first embodiment shown in FIG. 8.
Figure 12:
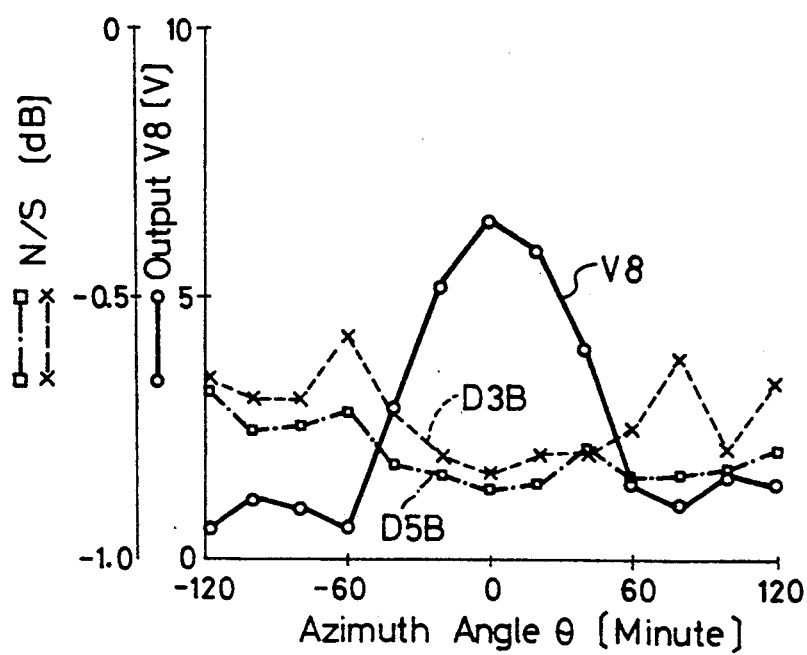
FIG. 12 is a graph graphing output characteristics of the magnetic sensor of the first embodiment shown in FIG. 8 relative to the change of an azimuth angle.

In the output circuit shown in FIG. 9, a characteristic of an output V8 relative to the change of the azimuth angle $\Theta$ was measured in actual practice. In that case, the rotation center is a central point 0 (see FIG. 8) of the MR element pattern formed on the magnetic sensor 32 and the output characteristic thereof is illustrated in FIG. 12. As is clear from FIG. 12, a position ($\theta=0$) at which the output V8 [V] is maximized relative to the change of the azimuth angle $\theta$ (minute) and a position ($\theta=0$) at which the three-order harmonic distortion D3B and the five-order harmonic distortion D5B are minimized are coincident with each other.

As described above, according to the first embodiment, the output V8 and the three-order harmonic distortion D3B or the like are changed symmetrically with respect to the change of the azimuth angle $\theta$ so that the position at which the maximum value of the output V8 is obtained and the position at which the minimum value of the harmonic distortion is obtained can be made substantially the same. Therefore, by adjusting the position of the magnetic sensor 32 relative to the magnetic scale 2 in such a manner that the output V8 is maximized when the output V8 is observed by means of the oscilloscope or the like, the magnetic sensor 32 can be autromtaically disposed at the position in which the harmonic wave is minimized, which can dispose the magnetic sensor 32 at the desired position with ease reliably.

Figure 13:
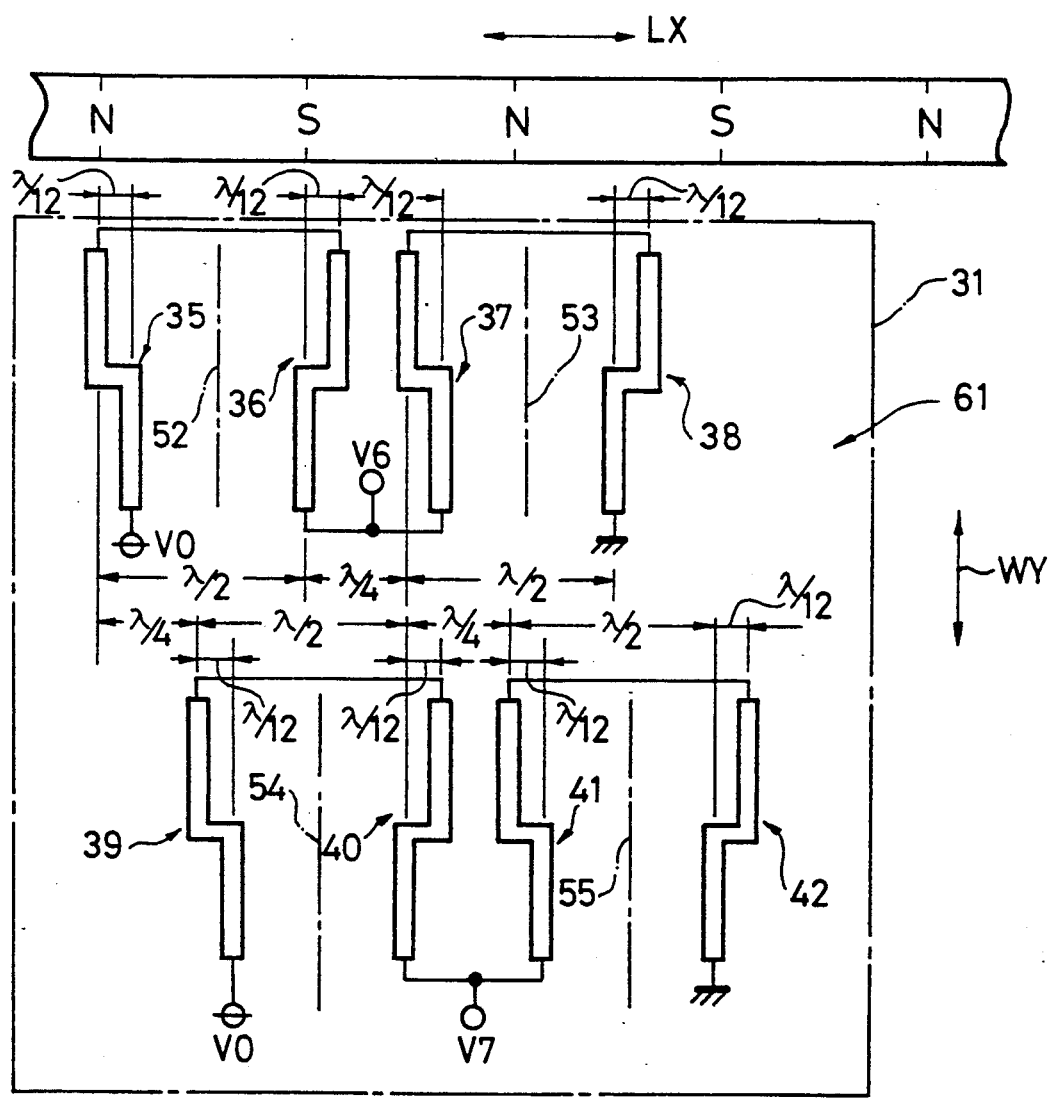
FIG. 13 is a schematic plan view illustrating a structure of a magnetic sensor according to a second embodiment of the present invention.

FIG. 13 shows a structure of a magnetic sensor 61 according to a second embodiment of the present invention. In the magnetic sensor 61 shown in the second embodiment of FIG. 13, like parts corresponding to those of FIG. 8 are marked with the same references and therefore need not be described in detail. In this magnetic sensor 61, the MR elements 39 to 42 are moved in the width direction WY to be located under the MR elements 35 to 38 to be distant from the latter by a distance of $\lambda/4$ in the length direction, respectively, to thereby form the pattern. Further, the MR element 35 and the MR element 36 are made symmetrical with respect to the central line 52 in the length direction LX. Other MR elements 37 through 42 are also made symmetrical with respect to central lines 53 to 55, respectively.

Also in the second embodiment shown in FIG. 13, as shown in FIG. 9, by constructing the output circuit thereof, substantially the same characteristic (see FIG. 12) of that of the magnetic sensor 32 shown in the first embodiment of FIG. 8 can be obtained. Therefore, if the magnetic sensor 61 is adjusted in position relative to the magnetic scale 2 such that the output V8 is maximized, then the magnetic sensor 61 can automatically be disposed at the position in which the harmonic wave is minimized. There is then the effect such that the magnetic sensor 61 can be disposed at the desired position with ease reliably.

As set out above, according to the magnetic sensor of the present invention, since the two MR elements having the partial MR elements made distant from each other by the distance of $(\lambda/2)\cdot(\frac{1}{m})$ (m=2, 3, 4, ...) in the length direction are shaped as substantially symmetrical configuration with respect to the central line of the length direction, the output characteristic thereof is changed symmetrically with respect to the change of the azimuth angle. Accordingly, the position at which the maximum value of the output is obtained and the position at which the minimum value of the harmonic wave is obtained can be made substantially the same. Therefore, by adjusting the position of the magnetic sensor relative to the magnetic scale such that the output is maximized, the magnetic sensor can be automatically disposed at the position in which the harmonic wave becomes minimized.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A magnetic sensor disposed in an opposing relation to a magnetic scale magnetized at a grating pitch $\lambda$ in its length direction and which is movable relative to said magnetic scale in its length direction comprising:

at least one pair of magnetoeffect resistance elements;

said pair of magnetoeffect resistance elements being arranged in the width direction perpendicular to said length direction and each of said magnetoeffect resistance elements being formed of a first partial magnetoeffect resistance element and an electrically connected second partial magnetoeffect resistance element;

said first partial magnetoeffect resistance element and said second partial magnetoeffect resistance element arranged substantially parallel to each other and offset by a distance of $(\lambda/2)\cdot(\frac{1}{2}m)$ (m=2, 3, 4, . . . ) in said length direction, wherein said pair of magnetoeffect resistance elements are disposed with distance of $(\lambda/2)$ n (n=1, 2, 3, . . . ) between said first partial magnetoeffect resistance element of a first one of said pair of magnetoeffect resistance elements and said second partial magnetoeffect resistance element of a second one of said pair of magnetoeffect resistance elements in said length direction, and wherein said pair of magnetoeffect resistance elements are shaped as substantially symmetrical configuration so as to be mirror images of each other relative to a central line perpendicular to said length direction, whereby an output of at least one pair of said magnetoeffect resistance elements is maximized and a distortion of said output of said magnetoeffect resistance elements is minimized at a given angle relative to said magnetic scale.

2. A magnetic sensor disposed in an opposing relation to a magnetic scale magnetized at a grating pitch $\lambda$ in its length direction and which is movable relative to said magnetic scale in its length direction comprising:

at least two pairs of magnetoeffect resistance elements disposed in the direction perpendicular to said length direction by a predetermined distance and offset by a distance of $\lambda/4$ in said length direction between said pairs;

each of said magnetoeffect resistance elements being formed of a first partial magnetoeffect resistance element and an electrically connected second partial magnetoeffect resistance element;

said first partial magnetoeffect resistance element and said second partial magnetoeffect resistance element arranged substantially parallel to each other and offset by a distance of $(\lambda/2)\cdot(\frac{1}{2}m)$ (m=2, 3, 4, . . . ) in said length direction, wherein each pair of said magnetoeffect resistance elements are shaped as substantially symmetrical configurations so as to form mirror images relative to a central line perpendicular to said length direction and a first partial magnetoeffect resistance element of a first one of each pair of magnetoeffect resistance elements is offset by a distance of $(\lambda/2)\cdot(\frac{1}{2}m)$ (m=2, 3, 4, . . . ) in said length direction from a second partial magnetoeffect resistance element of a second one of each pair of magnetoeffect resistance elements, whereby an output of said magnetoeffect resistance elements is maximized and a distortion of said output of said magnetoeffect resistance elements is minimized at a given angle relative to said magnetic scale.

* * * * *

UNITED STATES PATENT AND TRADEMARK OFFICE
CERTIFICATE OF CORRECTION

PATENT NO. : 5,216,363
DATED : June 1, 1993
INVENTOR(S) : Masaaki Kusumi

It is certified that error appears in the above-indentified patent and that said Letters Patent is hereby corrected as shown below:

On the title page, under item [19], change "Masaaki" to --Kusumi--, and item [75], change "Kusumi Masaaki" to --Masaaki Kusumi--

Col. 2, line 16, change "ar" to --are--
Col. 3, line 53, before "DESCRIPTION" insert --BRIEF--
Col. 4, line 21, after "from" delete ","
       line 49, change "an" to --MR--
       line 50, change "substantailly" to --substantially--
Col. 6, line 15, change "automtaically" to --automatically--
Col. 7, line 31, change "configuration" to --configurations--

Signed and Sealed this

Fourth Day of October, 1994

*Attest:*

BRUCE LEHMAN

*Attesting Officer*  *Commissioner of Patents and Trademarks*